(12) United States Patent
Kawakami et al.

(10) Patent No.: US 12,153,847 B2
(45) Date of Patent: Nov. 26, 2024

(54) IMAGE PROCESSING APPARATUS, IMAGE PROCESSING METHOD, STORAGE MEDIUM, AND IMAGE DISPLAY CONTROL SYSTEM

(71) Applicant: CANON KABUSHIKI KAISHA, Tokyo (JP)

(72) Inventors: Mari Kawakami, Kanagawa (JP); Rei Ishikawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/317,415

(22) Filed: May 15, 2023

(65) Prior Publication Data
US 2023/0385007 A1    Nov. 30, 2023

(30) Foreign Application Priority Data
May 24, 2022   (JP) ................. 2022-084695

(51) Int. Cl.
| | | |
|---|---|---|
| *G06F 3/14* | (2006.01) | |
| *G06F 3/04845* | (2022.01) | |
| *G06F 3/0488* | (2022.01) | |
| *G06T 3/40* | (2006.01) | |

(52) U.S. Cl.
CPC ............ *G06F 3/14* (2013.01); *G06F 3/04845* (2013.01); *G06F 3/0488* (2013.01); *G06T 3/40* (2013.01)

(58) Field of Classification Search
CPC ........ G06F 3/013; G06F 3/017; G06F 3/0481; G06F 3/1423
See application file for complete search history.

(56) References Cited

U.S. PATENT DOCUMENTS

| | | | | |
|---|---|---|---|---|
| 2007/0201839 A1* | 8/2007 | Murakami | ....... | H04N 21/42646 |
| 2017/0212717 A1* | 7/2017 | Zhang | ................. | G02B 27/017 |
| 2021/0266510 A1* | 8/2021 | Hayashi | ................. | G06F 1/163 |

FOREIGN PATENT DOCUMENTS

| | | | |
|---|---|---|---|
| JP | 2005099472 | A | 4/2005 |
| JP | 2005223765 | A | 8/2005 |
| JP | 2012059290 | A | 3/2012 |
| JP | 2012169819 | A | 9/2012 |
| WO | 2021037227 | A | 3/2021 |

* cited by examiner

*Primary Examiner* — Van N Chow
(74) *Attorney, Agent, or Firm* — Canon U.S.A., Inc. IP Division

(57) ABSTRACT

An image processing apparatus that causes an image to be displayed includes a selection unit configured to select at least one image from among a plurality of images, a display control unit configured to cause the image selected by the selection unit to be displayed, a change unit configured to change a display attribute of the image displayed by the display control unit, and an acquisition unit configured to, if the display attribute is changed by the change unit, acquire a high-resolution image of the image whose display attribute is changed, wherein upon completion of acquisition of the high-resolution image by the acquisition unit, the display control unit causes the high-resolution image to be displayed.

20 Claims, 8 Drawing Sheets

IMAGE COORDINATES TO DISPLAY REGION COORDINATES TRANSFORMATION MATRIX $$\begin{pmatrix} \text{ENLARGEMENT RATIO,} & 0.0, & \text{MOVEMENT AMOUNT } x \\ 0.0, & \text{ENLARGEMENT RATIO,} & \text{MOVEMENT AMOUNT } y \\ 0.0, & 0.0, & 1.0 \end{pmatrix}$$

IMAGE PROCESSING APPARATUS, IMAGE PROCESSING METHOD, STORAGE MEDIUM, AND IMAGE DISPLAY CONTROL SYSTEM

BACKGROUND

Field

The present disclosure relates to an image processing apparatus that causes an image to be displayed, an image processing method, a storage medium, and an image display control system.

Description of the Related Art

Nowadays, a large number of applications are used to save images captured by devices such as a camera and a smartphone in a storage service on a cloud and display the saved images in response to a request from a user using a display device. For image display in such applications, it is required that a sufficient response speed from a display request from the user to display of an image is secured and high-resolution display is provided so that the user can view details of the image by issuing an instruction for enlargement of the image. However, at initial display of the image the display of which has been requested, if an attempt is made to acquire and display a high-resolution image, it takes time to display the high-resolution image with an impairment in usability. This is because the file size of a high-resolution image is large due to improvement in camera performance and it takes time to acquire an image file.

In order to address such an issue, Japanese Patent Application Laid-Open No. 2005-099472 discusses a technique described below. More specifically, if an image is selected from among a plurality of images, a low-resolution image of the selected image is displayed in a predetermined display region, and preparation for displaying an original image of the selected image starts. Upon completion of the preparation for displaying the original image, the display in the predetermined display region is switched from the low-resolution image to the original image.

On the other hand, as techniques related to image display, Japanese Patent Application Laid-Open No. 2005-223765 and Japanese Patent Application Laid-Open No. 2012-59290 discuss methods for, if a specific region in a displayed image is designated, acquiring and displaying the image at a resolution suited to the designated specific region.

According to the technique discussed in Japanese Patent Application Laid-Open No. 2005-099472, as described above, a low-resolution image is initially displayed, and upon completion of the preparation for a high-resolution image, the high-resolution image is displayed. This makes it possible to secure a sufficient response speed from the display request from the user to the display of an image and to display a high-resolution image if the user wants to see the details of the image in an enlarged view. However, since high-resolution images of all selected images are acquired, a high-resolution image for an image whose detailed view is not necessary for the user is also acquired. This increases communication traffic due to the growing use of data by the user, which may cause congestion of a communication band.

On the other hand, by the techniques discussed in Japanese Patent Application Laid-Open No. 2005-223765 and Japanese Patent Application Laid-Open No. 2012-59290, it is possible to acquire and display an image at a specific resolution as a result of accepting a change of the display region. However, each time a change of the specific region is accepted, an image at a resolution suited to the specific region is generated and the generated image is acquired, and it takes time to display the generated image. In addition, there is a high possibility that data usage further increases to cause the congestion of the communication band.

SUMMARY

Various embodiments of the present disclosure are directed to preventing a delay in displaying an image selected from among a plurality of images and reducing the congestion of the communication band due to acquisition of a high-resolution image of the selected image.

According to one embodiment of the present disclosure, an image processing apparatus that causes an image to be displayed includes a selection unit configured to select at least one image from among a plurality of images, a display control unit configured to cause the image selected by the selection unit to be displayed, a change unit configured to change a display attribute of the image displayed by the display control unit, and an acquisition unit configured to, if the display attribute is changed by the change unit, acquire a high-resolution image of the image whose display attribute is changed, wherein upon completion of acquisition of the high-resolution image by the acquisition unit, the display control unit causes the high-resolution image to be displayed.

Further features of the present disclosure will become apparent from the following description of exemplary embodiments with reference to the attached drawings.

DESCRIPTION OF THE EMBODIMENTS

Hereinafter, an image display control system according to exemplary embodiments for carrying out features of the present disclosure, and a user terminal and an image management service included in the system will be described in detail with reference to the accompanying drawings. The configurations described in the following exemplary embodiment is a mere example, and the present invention is not limited to the illustrated configuration.

Exemplary Embodiment

In the present exemplary embodiment, an image captured by an imaging device such as a digital camera, a smartphone, or a tablet is defined as a high-resolution image. An image generated in advance from the high-resolution image at a decreased resolution is defined as a low-resolution image. The image display control system according to the present exemplary embodiment performs processes described below using a high-resolution image and a low-resolution image. More specifically, the image display control system accepts an instruction for selecting at least one image from among a plurality of low-resolution images, and displays the low-resolution image with a predetermined display attribute. The display attribute in the present exemplary embodiment refers to image display modes such as the display position of an image, the ratio of enlargement display or reduction display of the image (scaling ratio), the display angle of the image, and the like.

If an instruction for changing the display attribute of the displayed low-resolution image from a user is accepted, a high-resolution image corresponding to the low-resolution image is acquired. Upon completion of acquisition of the high-resolution image, the high-resolution image is displayed. An example of the process will be described below.

<Hardware Configuration>

Figure 1A:
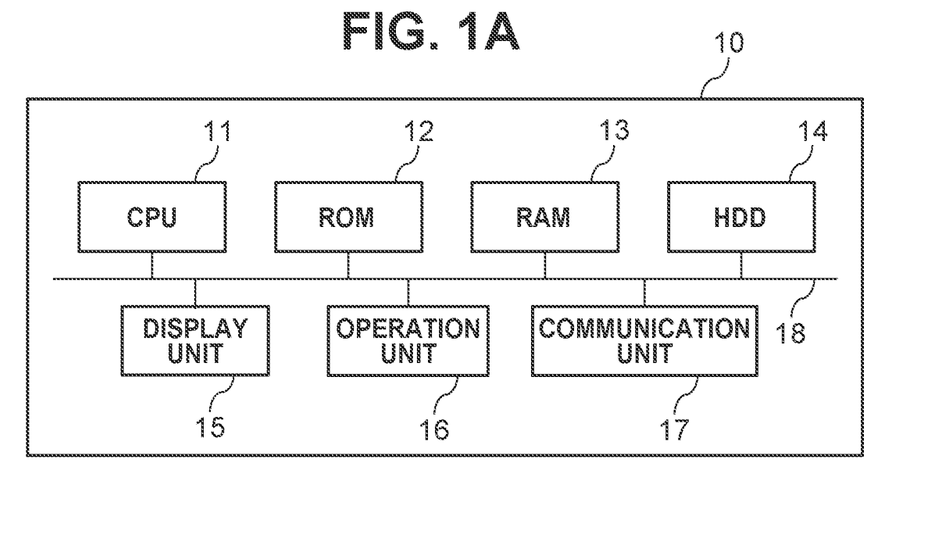
FIGS. 1A and 1B are diagrams each illustrating an example of a configuration of an image display control system.

FIG. 1A is a diagram illustrating a hardware configuration 10 of a user terminal included in the image display control system according to the present exemplary embodiment. Part or all of the hardware configuration 10 also serves as a hardware configuration of an image management service included in the image display control system. As illustrated in FIG. 1A, the hardware configuration 10 includes a central processing unit (CPU) 11, a read only memory (ROM) 12, a random access memory (RAM) 13, a hard disk drive (HDD) 14, a display unit 15, an operation unit 16, and a communication unit 17. The CPU 11 performs arithmetic operations and logical determinations in various processes to control the constituent elements connected to a system bus 18. The ROM 12 is a program memory that stores programs including various procedures of processes described below to be performed by the CPU 11. The RAM 13 is used as a temporary storage area such as a main memory or a work area for the CPU 11. The program memory can be replaced by an external storage apparatus or the like connected to the image display control system, from which a program is loaded into the RAM 13.

The HDD 14 is a hard disk drive for storing electronic data and programs according to the present exemplary embodiment. An external storage apparatus may be used to play a similar role. The external storage apparatus here can be implemented by a medium (recording medium) and an external storage drive for realizing access to the medium, for example. Known examples of such a medium include a flexible disk (FD), a compact disc read only memory (CD-ROM), a digital versatile disk (DVD), a universal serial bus (USB) memory, a magneto-optical disc (MO), and a flash memory. The external storage apparatus may be a server apparatus or the like connected via a network.

The display unit 15 is a cathode-ray tube (CRT) display, a liquid crystal display, or the like, for example. The display unit 15 is a device that outputs an image on a display screen. The display unit 15 may be an external device connected to the hardware configuration 10 in a wired or wireless manner. The operation unit 16 includes a keyboard, a mouse, a touch panel, and an eye-tracking device, and accepts various operations performed by the user. The communication unit 17 performs bidirectional communication in a wired or wireless manner with other apparatuses such as an information processing apparatus, a communication device, an external storage apparatus, and the like, by known communication technologies.

<Functional Configuration>

Figure 1B:
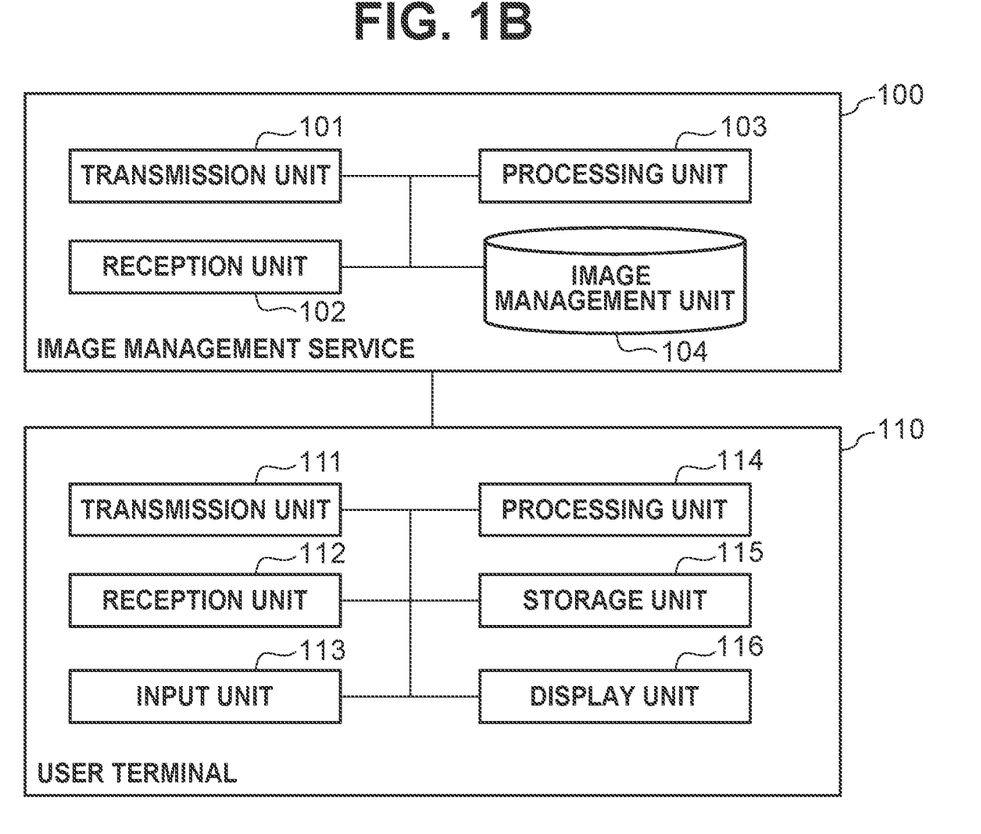

FIG. 1B illustrates an example of a block diagram illustrating functional configurations of an image management service 100 and a user terminal 110 included in the image display control system. Functional units are implemented by the CPU 11 loading a program stored in the ROM 12 into the RAM 13 and executing processes in accordance with flowcharts described below. Then, execution results of the processes are held in the RAM 13. If a hardware configuration is to be provided in place of software processes using the CPU 11, arithmetic operation units and circuits are provided in correspondence with the processes performed by the functional units described below.

The image management service 100 functions as an image management server, and stores and manages high-resolution images and low-resolution images. The user terminal 110 functions as an image processing apparatus. The user terminal 110 displays the images received from the image management service 100, issues an instruction for an image to be displayed in detail, and issues an instruction for changing the display attribute. By issuing the instruction for changing the display attribute, the user terminal 110 transmits information on a request for acquiring a high-resolution image to the image management service 100.

<Image Management Service>

The image management service 100 includes a transmission unit 101, a reception unit 102, a processing unit 103, and an image management unit 104.

The transmission unit 101 transmits high-resolution images and low-resolution images to the user terminal 110.

The reception unit 102 receives information transmitted from the user terminal 110.

The processing unit 103 acquires a high-resolution image associated with a low-resolution image from the image management unit 104 on the basis of the information received from the user terminal 110. The acquired high-resolution image is transmitted from the transmission unit 101 to the user terminal 110.

The image management unit 104 manages the high-resolution images and the low-resolution images generated in advance from the high-resolution images each at a decreased resolution.

<User Terminal>

The user terminal 110 includes a transmission unit 111, a reception unit 112, an input unit 113, a processing unit 114, a storage unit 115, and a display unit 116. The user terminal 110 is implemented by a personal computer, a smartphone, a tablet terminal, or the like, for example.

The transmission unit 111 transmits information on a request for acquisition of a high-resolution image to the image management service 100.

The reception unit 112 receives low-resolution images, high-resolution images, and the like from the image management service 100.

The input unit 113 accepts various operations performed by the user.

In response to an user instruction accepted by the input unit 113, the processing unit 114 makes various determinations on whether to issue an instruction for acquisition of a high-resolution image or performs a process of calculating the scaling ratio at which to display a high-resolution image in an enlarged or reduced view.

The storage unit 115 stores the low-resolution images and the high-resolution images transmitted from the image management service 100 and received by the reception unit 112.

The display unit 116 displays the low-resolution images and the high-resolution images acquired by the reception unit 112, characters, graphics, and the like to the user operating the user terminal 110.

<Flow of Processing>

Figure 2:
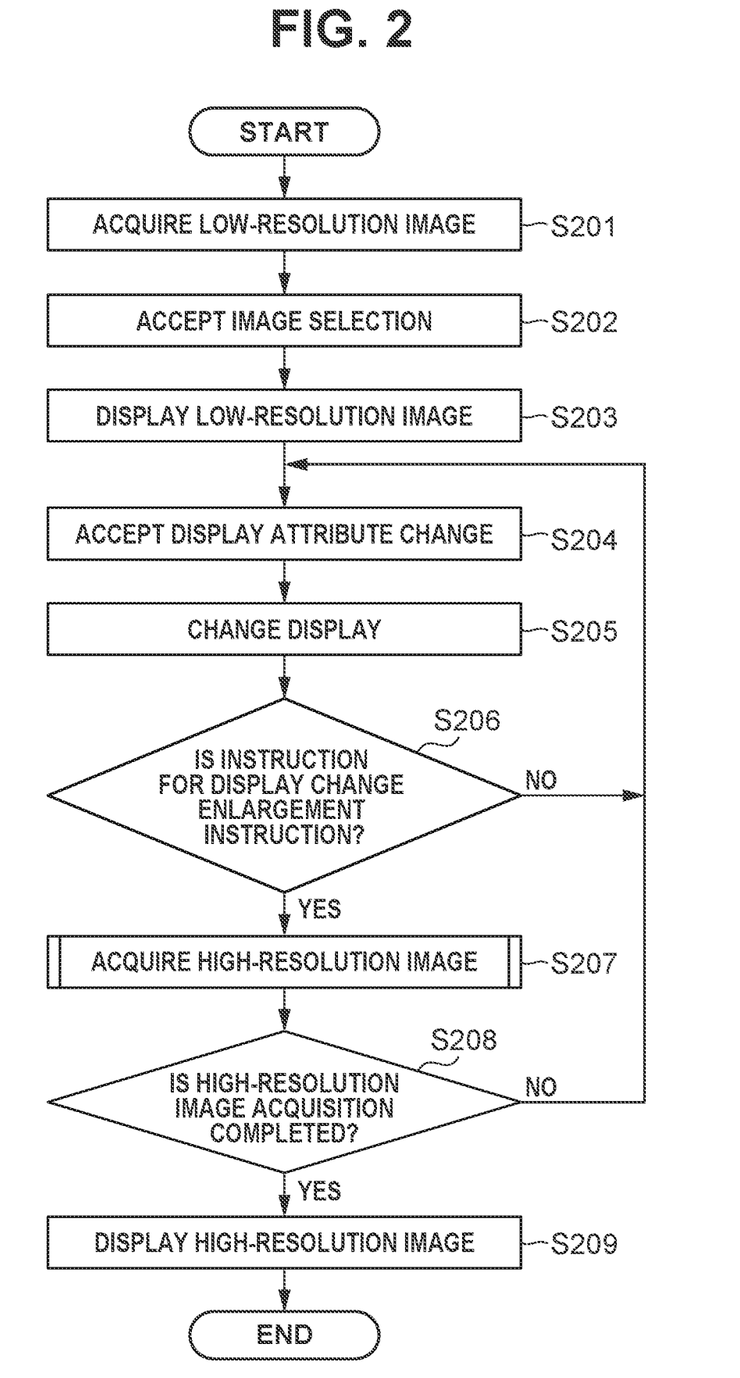
FIG. 2 is a flowchart illustrating whole processing according to one exemplary embodiment.

FIG. 2 is a flowchart illustrating an example of the contents of the processing in the image display control system according to the present exemplary embodiment.

Figure 4A:
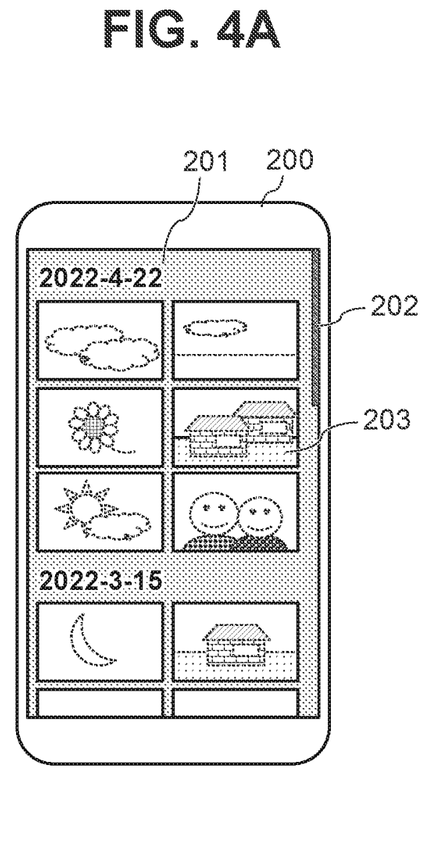
FIGS. 4A and 4B are diagrams illustrating examples of a user interface in which a plurality of low-density images and a selected image are displayed.

First, in acquiring a low-resolution image in step S201, the user terminal 110 acquires one or more low-resolution images by the reception unit 112 from the image management service 100. The user terminal 110 then displays a list of the acquired low-resolution images on the display unit 116. The displayed low-resolution images are stored in the storage unit 115. FIG. 4A illustrates an example of a screen on which a plurality of low-resolution images is displayed. A user terminal 200 corresponds to the user terminal 110, and a display unit 201 corresponds to the display unit 116 of the user terminal 110. Sliding a scroll bar 202 allows images hidden at an initial stage to come into view.

Next, in step S202, the user terminal 110 accepts selection of one image from among the plurality of low-resolution images displayed in step S201, by the input unit 113.

Figure 4B:
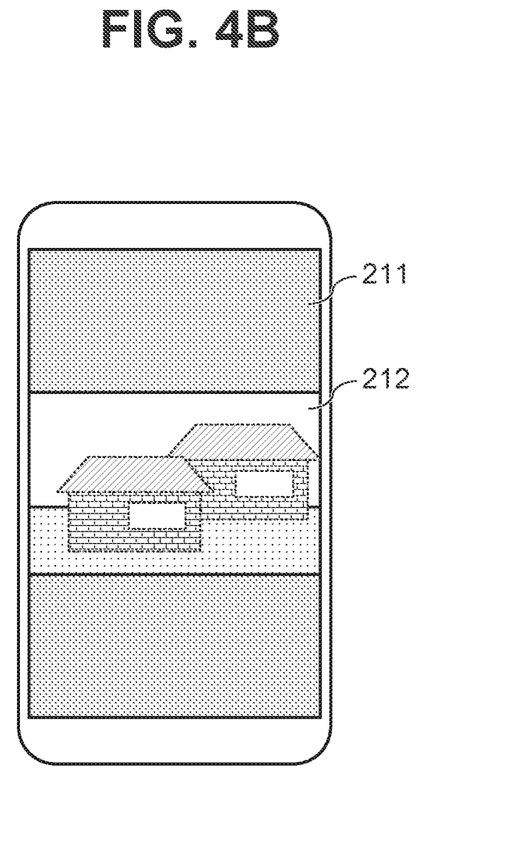

In step S203, the user terminal 110 reads the one image the selection of which has been accepted in step S202 from the storage unit 115 and displays the image on the display unit 116. The image is displayed at a scaling ratio that is calculated so that the length or width of the image fits the length or width of a region of the display unit 116. FIG. 4B illustrates an example of a screen when the selection of an image 203 is accepted in FIG. 4A and the low-resolution image 203 is displayed on the display unit 116. A display unit 211 corresponds to the display unit 116 of the user terminal 110, and an image 212 corresponds to the displayed low-resolution image. For example, if the screen region size of the display unit 116 is 1080 wide×1692 long and the size of the low-resolution image to be displayed is 640 wide×427 long, the scaling ratios are calculated for the length and the width. The image is resized to 1080÷640=1.69 times and displayed so that the image fits the screen region at the width at a lower scaling ratio.

In step S204, the user terminal 110 accepts a change in the display attribute of the low-resolution image displayed on the display unit 116, by the input unit 113. In accepting the change in the display attribute, the user terminal 110 accepts a click operation, a drag operation, a pinch-out operation, and a pinch-in operation on the image, and a change in line of sight, a change in open and close states of eyelids, and the like.

Figure 5A:
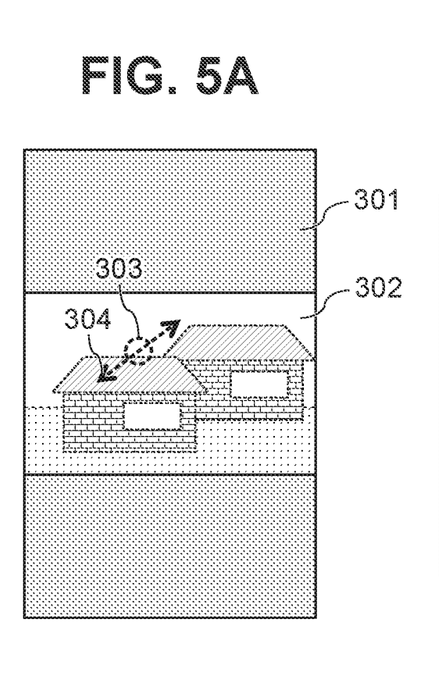
FIGS. 5A and 5B are diagrams illustrating examples of a user interface in which an instruction for changing image display attribute is issued and image display is updated.
Figure 5B:
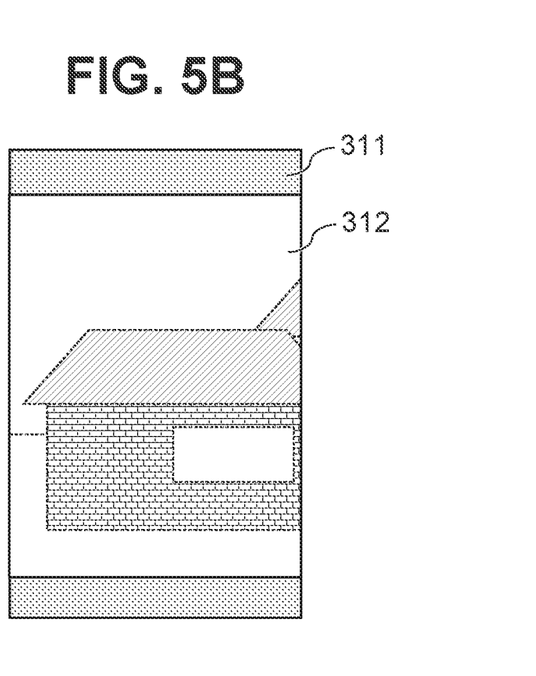

In step S205, the user terminal 110 changes the display of the image in response to the instruction for changing the display attribute in step S204. FIGS. 5A and 5B illustrate an example in which a pinch-out operation is performed on the low-resolution image to change the display attribute, and the display on the screen is changed with the changed display attribute. In FIG. 5A, a display region 301 corresponds to the display region of the display unit 116, and an image 302 corresponds to the low-resolution image displayed on the display unit 116. This means that a pinch-out operation is performed by fingers moving in directions of a bidirectional arrow 304 centering on a circle 303 of the low-resolution image 302. In FIG. 5B, a display region 311 corresponds to the display region of the display unit 116, and an image 312 corresponds to an example in which the display of the low-resolution image is changed with the display attribute changed by the pinch-out operation to partially display a scaled image.

In step S206, the user terminal 110 determines whether the instruction for display change accepted in step S205 is a scaling instruction, and the process branches.

If the user terminal 110 determines in step S206 that the instruction for display change is an enlargement instruction (YES in step S206), the processing proceeds to step S207.

On the other hand, if the user terminal 110 determines that the instruction for display change is not an enlargement instruction (NO in step S206), the user terminal 110 performs the process for accepting the display attribute change in step S204 again.

As for the determination on whether the instruction for display change is an enlargement instruction, if the scaling ratio calculated in step S204 is greater than the previous scaling ratio, the user terminal 110 determines that the instruction for display change is an enlargement instruction. In the case of a clip-in operation, the scaling ratio becomes small, and thus the user terminal 110 determines that the instruction for display change is not an enlargement instruction.

If the user terminal 110 determines in step S206 that the instruction for display change is the enlargement instruction (YES in step S206), the user terminal 110 executes a process of step S207.

In step S207, the user terminal 110 transmits a request for acquiring a high-resolution image corresponding to the low-resolution image displayed on the display unit 116 by the transmission unit 111 to the image management service 100. The image management service 100 receives the request for image acquisition by the reception unit 102 and acquires the high-resolution image from the image management unit 104 via the processing unit 103. The image management service 100 transmits the acquired high-resolution image by the transmission unit 101 to the user terminal 110.

In step S208, the user terminal 110 determines whether the high-resolution image the acquisition of which has been requested in step S207 is received by the reception unit 112, and the process branches. Details of the operation in step S208 will be described below with reference to the flowchart in FIG. 3.

If the user terminal 110 determines in step S208 that the acquisition of the high-resolution image is completed (YES in step S208), the processing proceeds to step S209.

On the other hand, if the user terminal 110 determines in step S208 that the acquisition of the high-resolution image is not completed (NO in step S208), the user terminal 110 performs the process for accepting the display attribute change in step S204 again.

Figure 6A:
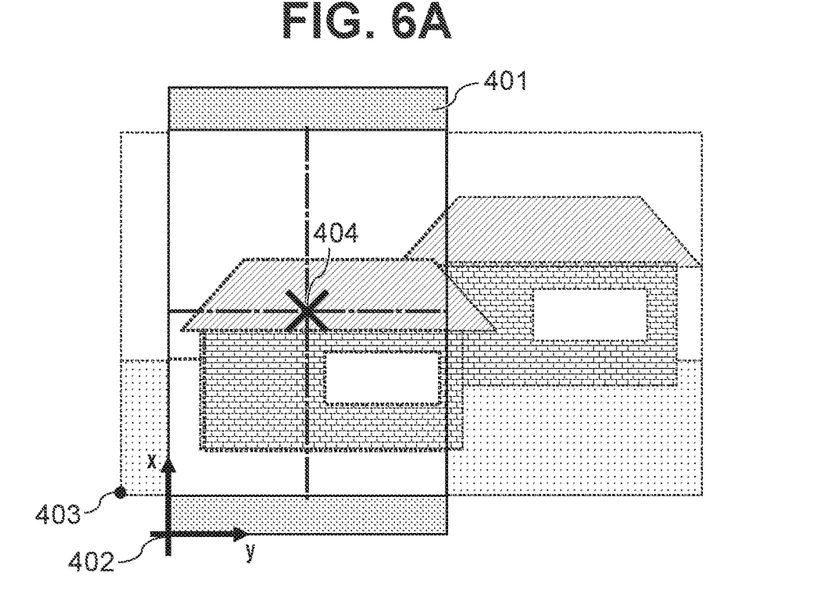
FIGS. 6A, 6B, 6C, and 6D are diagrams illustrating an example of a process of displaying a high-resolution image from a low-resolution image.
Figure 6B:
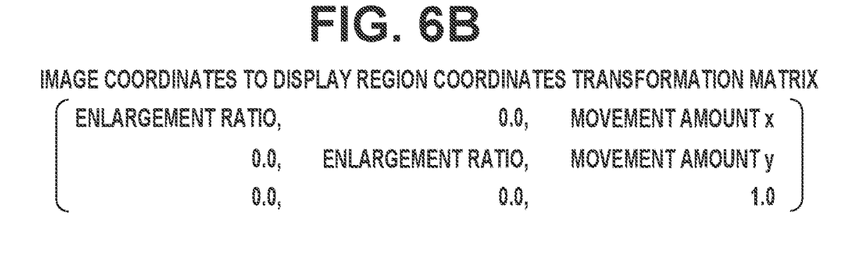

In step S209, the user terminal 110 stores the high-resolution image received by the reception unit 112 in association with the low-resolution image in the storage unit 115. Next, the user terminal 110 acquires the scaling ratio and the display position of the low-resolution image displayed on the display unit 116. The scaling ratio is calculated by the processing unit 114 from the size of the low-resolution image and the size of the currently displayed image. The display position is represented by coordinates at the lower left of the low-resolution image with the lower left of the display region of the display unit 116 as an origin point of (0, 0). FIGS. 6A to 6D illustrate an example of the display position of the low-resolution image displayed in a scaled view on the display unit 116. In FIG. 6A, a display region 401 indicates the display region of the display unit 116. An origin point 402 indicates the origin point (0, 0) of the display unit 116. A point 403 indicates coordinates at the lower left of the low-resolution image displayed in a scaled view. Assuming that the coordinates of the point 403 are (movement amount x, movement amount y), as illustrated in FIG. 6B, a transformation matrix from image coordinates to display region coordinates is derived, and an inverse matrix relative to the transformation matrix is determined.

Figure 6C:
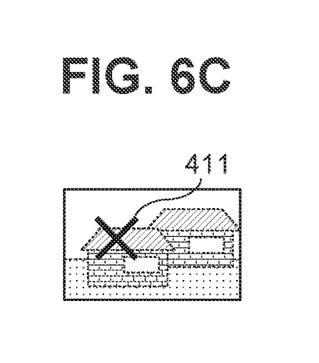
Figure 6D:
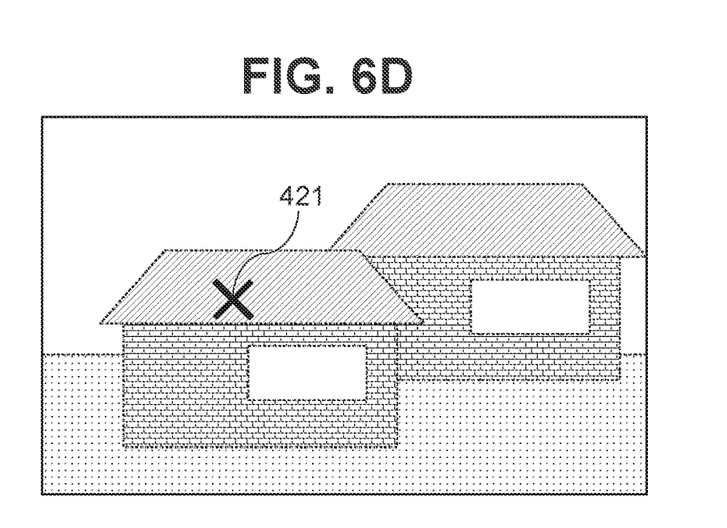

In order to resize the displayed image, to determine coordinates to be displayed at the center of the display region and a scaling ratio, first, central coordinates 404 of a display region in FIG. 6A is acquired, and coordinates 411 are determined in a low-resolution image in FIG. 6C from the determined inverse matrix. Then, coordinates 421 are determined in a high-resolution image in FIG. 6D from a ratio between the high-resolution image and the low-resolution image. The determined coordinates 421 and the scaling ratio are specified, and the high-resolution image is displayed on the display unit 116.

Figure 7:
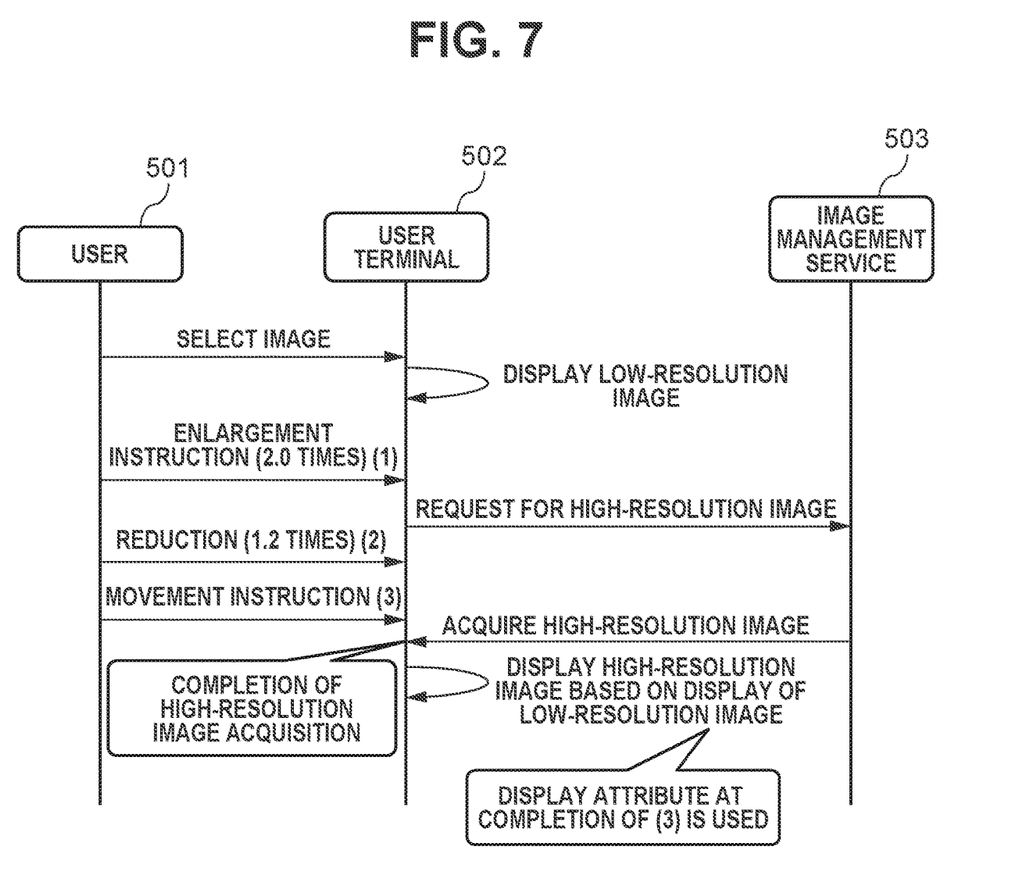
FIG. 7 is a sequence diagram illustrating processing when a display attribute of a high-resolution image is acquired.

FIG. 7 illustrates an example of a sequence diagram describing timings for change of the display attribute and display of a high-resolution image after the selection of one low-resolution image in step S202. FIG. 7 illustrates the sequence diagram including a user 501, a user terminal 502 corresponding to the user terminal 110 in FIG. 1B, and an image management service 503 corresponding to the image management service 100 in FIG. 1B.

The user terminal 502, having accepted an instruction for image selection from the user 501 via the input unit 113, displays a low-resolution image. Next, the user terminal 502 accepts an enlargement instruction (1) from the user 501 via the input unit 113 and determines that the instruction is an enlargement instruction, and thus requests the image management service 503 to acquire a high-resolution image. Until the acquisition of the high-resolution image, the user terminal 502 accepts display attribute changes such as a reduction instruction (2) and a movement instruction (3) via the input unit 113. Upon completion of the acquisition of the high-resolution image, the user terminal 502 acquires the display attribute of the low-resolution image displayed on the display unit 116 after the movement instruction (3). From the acquired display attribute, the processing unit 114 calculates a display position and a scaling ratio of the high-resolution image and displays the high-resolution image at the display position and the scaling ratio.

If the display attribute of the display unit 116 at the completion of acquisition of the high-resolution image indicate that the scaling ratio is unchanged from that of initial display, the low-resolution image may remain displayed without switching to the high-resolution image.

Figure 3:
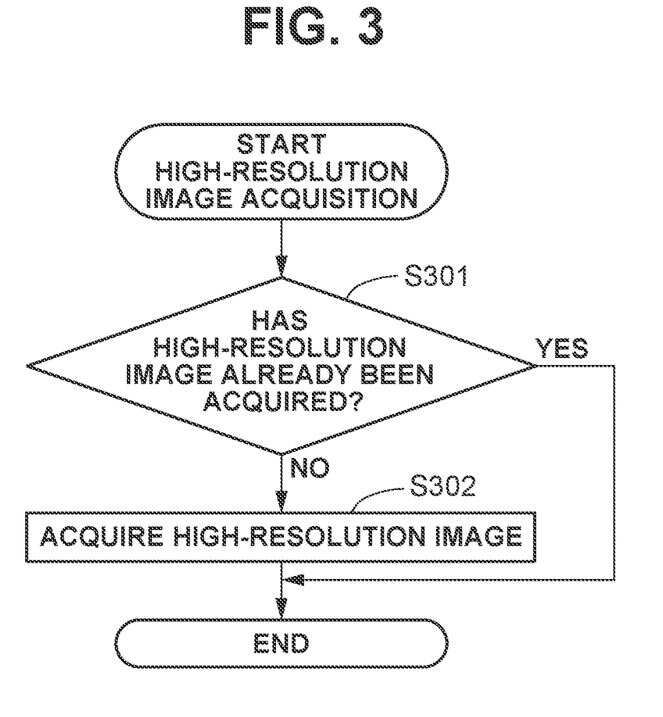
FIG. 3 is a flowchart illustrating a high-resolution image acquisition process.

FIG. 3 is a flowchart illustrating the details of the process for acquiring the high-resolution image in the user terminal 110, which is executed in step S207 in FIG. 2.

In step S301, the user terminal 110 determines whether the high-resolution image corresponding to the low-resolution image displayed on the display unit 116 has already been acquired, and the process branches.

Whether the high-resolution image has already been acquired is determined based on whether the high-resolution image corresponding to the low-resolution image is stored in the storage unit 115.

If the user terminal 110 determines in step S301 that the high-resolution image has already been acquired (YES in step S301), it is no longer necessary to acquire the high-resolution image, and the process for acquiring the high-resolution image is ended.

On the other hand, if the user terminal 110 determines in step S301 that the high-resolution image has not been acquired (NO in step S301), the user terminal 110 executes step S302.

In step S302, the user terminal 110 transmits a request for acquiring the high-resolution image corresponding to the low-resolution image displayed on the display unit 116 by the transmission unit 111 to the image management service 100. The image management service 100 receives the request for image acquisition by the reception unit 102 and acquires the high-resolution image from the image management unit 104 via the processing unit 103. The image management service 100 transmits the acquired high-resolution image by the transmission unit 101 to the user terminal 110.

Figure 8:
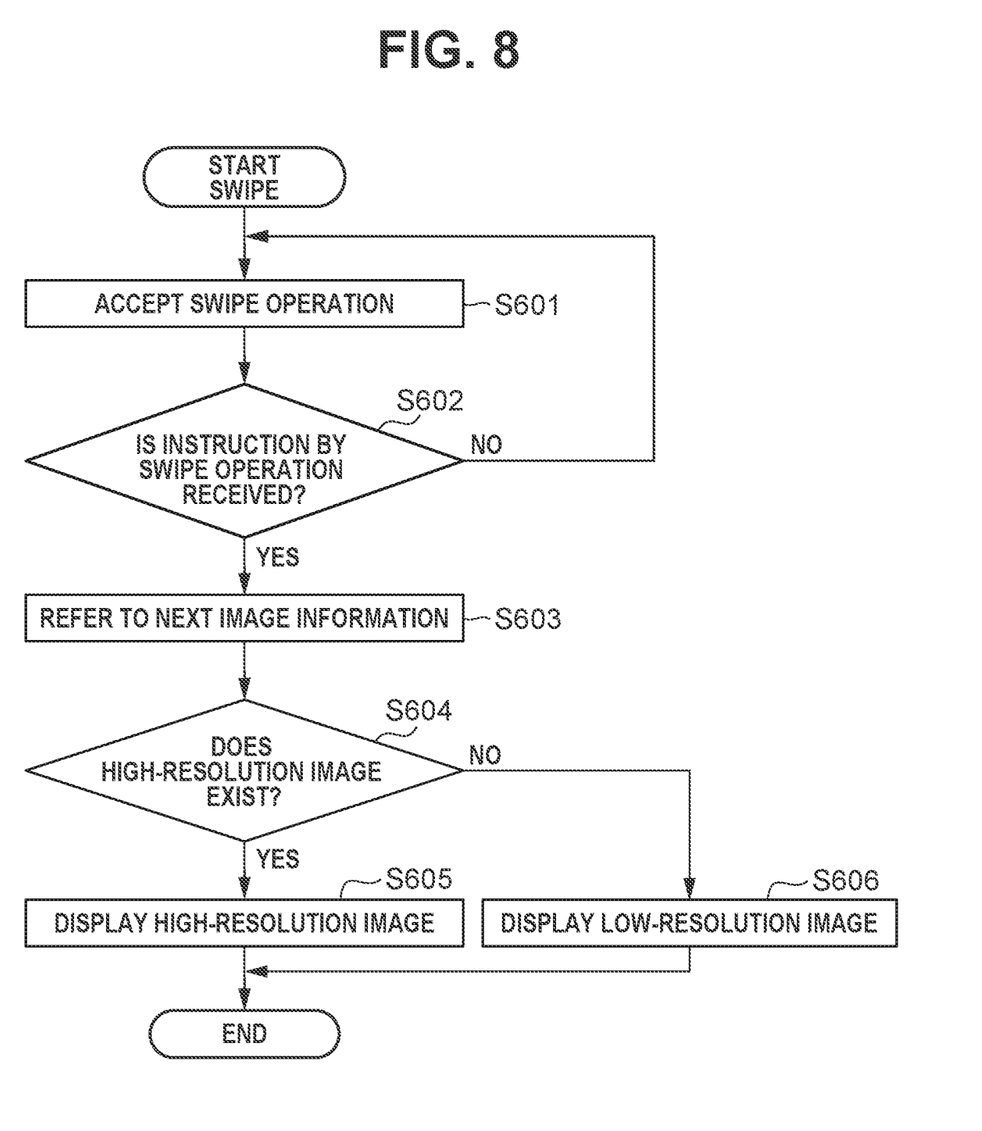
FIG. 8 is a flowchart illustrating a process of displaying images in sequence with a swipe.

FIG. 8 is a flowchart illustrating an example of a process when a swipe operation is performed on an image in the user terminal 110.

First, in step S601, the user terminal 110 accepts a swipe operation by the input unit 113. When a swipe operation is performed, images are sequentially displayed.

In step S602, the user terminal 110 determines whether an instruction by a swipe operation is received. If the user terminal 110 determines that the instruction by the swipe operation is received (YES in step S602), the user terminal 110 executes step S603. If the user terminal 110 determines in step S602 that no swipe operation is received (NO in step S602), the user terminal 110 performs the process of accepting a swipe operation in step S601 again.

In step S603, the user terminal 110 refers to image information of the next display target stored in the storage unit 115. In referring to the image information, the user terminal 110 refers to a low-resolution image and a high-resolution image.

In step S604, the user terminal 110 determines whether there exists a high-resolution image corresponding to the image information of the next display target that has been referred to in step S603. If the high-resolution image exists (YES in step S604), the user terminal 110 executes step S605. On the other hand, if the high-resolution image does not exist (NO in step S604), the user terminal 110 executes step S606.

In step S605, the user terminal 110 displays the high-resolution image of the next image on the display unit 116.

In step S606, the user terminal 110 displays the low-resolution image of the next image on the display unit 116.

In the exemplary embodiment described above, at the time of displaying an image selected from among a plurality of images, if an instruction for display change with regard to a low-resolution image is accepted, a high-resolution image corresponding to the low-resolution image is acquired. Then, upon completion of acquisition of the high-resolution image, the high-resolution image is displayed, so that it is possible to reduce the usage of data unnecessary for the user and the congestion of the communication band.

If the high-resolution image has already been acquired, the high-resolution image is not acquired again to further reduce the usage of unnecessary data and the congestion of the communication band.

The high-resolution image according to the present exemplary embodiment has been described as an original image captured by an imaging device. However, the original image varies in the number of pixels depending on performance and settings of the imaging device. Accordingly, an image with the certain number of pixels smaller than that of the original image may be generated and prepared in advance as the high-resolution image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-084695, filed May 24, 2022, which is hereby incorporated by reference herein in its entirety.

What is claimed is:

1. An image processing apparatus that causes an image to be displayed, the image processing apparatus comprising:
   one or more processors; and
   one or more memories storing instructions that, when executed, cause the one or more processors to perform:
   selecting an image from among a plurality of images;
   causing a low-resolution version of the selected image to be displayed on a display;
   changing a display attribute of the displayed image in response to a user input;
   after the display attribute of the displayed image is changed, starting a process for acquiring image data for a high-resolution image corresponding to the displayed image whose display attribute has been changed,
   wherein the process of acquiring the image data for the high-resolution image comprises transmitting an image acquisition request for the image data to an external apparatus, and, in response, receiving from the external apparatus the image data; and
   upon completion of acquisition of the image data for the high-resolution image, causing an image to be displayed that is based on the acquired image data for the high-resolution image.

2. The image processing apparatus according to claim 1, wherein the display attribute includes at least one of a display position of the image and a scaling ratio of the image.

3. The image processing apparatus according to claim 1, wherein the user input comprises at least one operation of a click operation, a pinch-in, a pinch-out, a change in line of sight, and a change in open and closed states of eyelids, and the image processing apparatus changes the display attribute based on the operation.

4. The image processing apparatus according to claim 1,
   wherein the one or more processors further causes images included in the plurality of images to be sequentially displayed in response to a swipe operation by a user, and
   wherein, if high-resolution images of the images to be sequentially displayed have previously been acquired at a time of sequential display, the one or more processors cause the previously acquired high-resolution images to be displayed.

5. The image processing apparatus according to claim 1, wherein in accordance with the image data for the high-resolution image being received, the image processing apparatus stores the image data in association with image data for the low-resolution image in a storage, the image data for the low-resolution image already stored in the storage.

6. The image processing apparatus according to claim 5, wherein the one or more processors further perform, in a first displaying, causing a first image to be displayed on the display, based on the acquired image data for the high-resolution image stored in the storage and a first user input changing a display attribute of a displayed image, and in a second displaying, causing a second image to be displayed on the display, based on the acquired image data for the high-resolution image stored in the storage and a second user input changing a display attribute of a displayed image, the first user input received at a different time from the second user input, and the first user input being different from the second user input.

7. An image processing apparatus that causes an image to be displayed, the image processing apparatus comprising:
   one or more processors; and
   one or more memories storing instructions that, when executed, cause the one or more processors to perform:
   selecting an image from among a plurality of images;
   causing a low-resolution version of the selected image to be displayed on a display;
   changing a display attribute of the displayed image in response to a user input,
   wherein, in a case where the display attribute has been changed and image data for a high-resolution image corresponding to the image whose display attribute has been changed has previously been acquired, causing an image to be displayed that is based on the previously acquired image data for the high-resolution image,
   wherein, in a case where image data for the high-resolution image of the image whose display attribute has been changed has not previously been acquired, (i) starting a process, after the display attribute of the displayed image is changed, for acquiring the image data for the high-resolution image, the process of acquiring the image data for the high-resolution image comprising transmitting an image acquisition request for the image data to an external apparatus, and, in response, receiving from the external apparatus the image data, and (ii) upon completion of acquisition of the image data for the high-resolution image, causing an image to be displayed that is based on the acquired image data for the high-resolution image.

8. The image processing apparatus according to claim 1, wherein, upon completion of the acquisition of the image data for the high-resolution image, causing the high-resolution image to be displayed based on the display attribute of the image at the completion of the acquisition of the image data for the high-resolution image by the image processing apparatus.

9. An image processing method for causing an image to be displayed, comprising:
    selecting an image from among a plurality of images;
    causing a low-resolution version of the selected image to be displayed on a display;
    controlling to change a display attribute of the displayed image in response to a user input;
    after the display attribute of the displayed image is changed, starting a process for acquiring image data for a high-resolution image corresponding to the displayed image whose display attribute has been changed,
    wherein the process of acquiring the image data for the high-resolution image comprises transmitting an image acquisition request for the image data to an external apparatus, and, in response, receiving from the external apparatus the image data; and
    upon completion of acquisition of the image data for the high-resolution image, causing an image to be displayed that is based on the acquired image data for the high-resolution image.

10. An image processing method according to claim 9, wherein the display attribute includes at least one of a display position of the image and a scaling ratio of the image.

11. The image processing method according to claim 9, wherein the user input comprises at least one operation of a click operation, a pinch-in, a pinch-out, a change in line of sight, and a change in open and closed states of eyelids, and the display attribute is changed based on the operation.

12. The image processing method according to claim 9, wherein, upon completion of the acquisition of the image data for the high-resolution image in the acquiring, causing the high-resolution image to be displayed based on the display attribute of the image at the completion of the acquisition of the image data for the high-resolution image in the acquiring.

13. The image processing method according to claim 9, wherein, in the controlling, images included in the plurality of images are sequentially displayed in response to a swipe operation by a user, and
    wherein, in a case where high-resolution images of the images to be sequentially displayed have previously been acquired at a time of sequential display, the previously acquired high-resolution images are displayed.

14. The image processing method according to claim 9, wherein in accordance with the image data for the high-resolution image being received, storing the image data in association with image data for the low-resolution image in a storage, the image data for the low-resolution image already stored in the storage.

15. The image processing method according to claim 14, further comprising, in a first displaying, causing a first image to be displayed on the display, based on the acquired image data for the high-resolution image stored in the storage and a first user input changing a display attribute of a displayed image, and in a second displaying, causing a second image to be displayed on the display, based on the acquired image data for the high-resolution image stored in the storage and a second user input changing a display attribute of a displayed image, the second user input received at a different time from the first user input, and the first user input being different from the second user input.

16. An image processing method for causing an image to be displayed, comprising:
    selecting an image from among a plurality of images:
    causing a low-resolution version of the selected image to be displayed on a display;
    changing a display attribute of the displayed image in response to a user input,
    wherein, in a case where the display attribute has been changed in the changing and image data for a high-resolution image corresponding to the image whose display attribute has been changed has previously been acquired, the high-resolution image of the image whose display attribute is changed is not acquired in the acquiring, and
    wherein, in a case where image data for the high-resolution image of the image whose display attribute is has been changed has not previously been acquired, (i) starting a process, after the display attribute of the displayed image is changed, for acquiring the image data for the high-resolution image, the process of acquiring the image data for the high-resolution image comprising transmitting an image acquisition request for the image data 1 to an external apparatus, and, in response, receiving from the external apparatus the image data, and (ii) upon completion of acquisition of the image data for the high-resolution image, causing an image to be displayed that is based on the acquired image data for the high-resolution image.

17. A non-transitory storage medium storing a program causing a computer to execute image display, the method comprising:
    selecting an image from among a plurality of images;
    causing a low-resolution version of the selected image to be displayed on a display;
    changing a display attribute of the displayed image in response to a user input;
    after the display attribute of the displayed image is changed, starting a process for acquiring image data for a high-resolution image corresponding to the displayed image whose display attribute has been changed,
    wherein the process of acquiring the image data for the high-resolution image comprises transmitting an image acquisition request for the image data to an external apparatus, and, in response, receiving from the external apparatus the image data; and
    upon completion of acquisition of the image data for the high-resolution image, causing an image to be displayed that is based on the acquired image data for the high-resolution image.

18. The non-transitory storage medium according to claim 17, wherein the method further comprises, in accordance with the image data for the high-resolution image being received, storing the image data in association with image data for the low-resolution image in a storage, the image data for the low-resolution image already stored in the storage.

19. The non-transitory storage medium according to claim 18, wherein the method further comprising, in a first displaying, causing a first image to be displayed on the display, based on the acquired image data for the high-resolution image stored in the storage and a first user input changing a display attribute of a displayed image, and in a second displaying, causing a second image to be displayed on the display, based on the acquired image data for the high-resolution image stored in the storage and a second user input changing a display attribute of a displayed image, the second user input received at a different time from the first user input, and the first user input being different from the second user input.

20. An image display control system comprising:
an image management server configured to manage an image; and
an image processing apparatus that causes the image to be displayed,
wherein the image management server includes:
one or more processors; and
one or more memories storing instructions that, when executed, cause the one or more processors to perform:
saving image data for a plurality of images and high-resolution images of the plurality of images; and
transmitting the image data for the plurality of images and the high-resolution images, and
wherein the image processing apparatus includes:
one or more processors; and
one or more memories storing instructions that, when executed, cause the one or more processors to perform:
selecting an image from among the plurality of images acquired from the image management server;
causing a low-resolution version of the selected image to be displayed on a display;
changing a display attribute of the displayed image in response to a user input;
after the display attribute of the displayed image is changed, starting a process for acquiring image data for a high-resolution image corresponding to the displayed image whose display attribute has been changed,
wherein the process of acquiring the image data for the high-resolution image comprises transmitting an image acquisition request for the image data to an external apparatus, and, in response, receiving from the external apparatus the image data; and
upon completion of acquisition of the image data for the high-resolution image, causing an image to be displayed that is based on the acquired image data for the high-resolution image.

* * * * *